US008223356B2

(12) United States Patent
Kadowaki

(10) Patent No.: US 8,223,356 B2
(45) Date of Patent: Jul. 17, 2012

(54) PRINTING SERVICE ORDERING SYSTEM AND ORDERING METHOD

(75) Inventor: Toshihiro Kadowaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1339 days.

(21) Appl. No.: 10/990,901

(22) Filed: Nov. 16, 2004

(65) Prior Publication Data

US 2005/0122540 A1    Jun. 9, 2005

(30) Foreign Application Priority Data

Dec. 3, 2003    (JP) ................................. 2003-404560

(51) Int. Cl.
*G06F 3/12*    (2006.01)

(52) U.S. Cl. ...................................... 358/1.15; 382/100

(58) Field of Classification Search ........ 358/1.11–1.18, 358/474; 399/80; 379/100.06; 709/203; 382/100

See application file for complete search history.

(56) References Cited

U.S. PATENT DOCUMENTS

| | | | |
|---|---|---|---|
| 6,172,761 B1 * | 1/2001 | Ohtani ......................... | 358/1.12 |
| 6,289,371 B1 * | 9/2001 | Kumpf et al. ................ | 709/203 |
| 6,330,068 B1 | 12/2001 | Matsuyama | |
| 6,335,966 B1 * | 1/2002 | Toyoda ..................... | 379/100.06 |
| 6,567,177 B2 | 5/2003 | Matsuyama | |
| 6,647,126 B1 * | 11/2003 | Wen .............................. | 382/100 |
| 6,807,388 B1 * | 10/2004 | Kojima et al. .................. | 399/80 |
| 2002/0030840 A1 * | 3/2002 | Itaki et al. ..................... | 358/1.13 |
| 2002/0033964 A1 * | 3/2002 | Suzuki et al. ................ | 358/1.15 |
| 2002/0114021 A1 * | 8/2002 | Lavender et al. ............. | 358/474 |

FOREIGN PATENT DOCUMENTS

JP    2004025750 A    *    1/2004

* cited by examiner

*Primary Examiner* — Twyler Haskins
*Assistant Examiner* — Lennin Rodriguez
(74) *Attorney, Agent, or Firm* — Canon USA, Inc., IP Division

(57) ABSTRACT

An image reading device reads an original document image and generates original document data, and sends a job made up of the generated original document data and first information necessary for processing to be performed at a service providing device based on this original document data, to the service providing device, and further, notifies an information processing device or the user of the information processing device, of the job identification information of the job that has been sent. The information processing device acquires the job identification information notified thereto and sends, to the service providing device, second information necessary for the processing to be performed at the service providing device relating to the job corresponding to the job identification information. This improves the operational functionality in the case of sending read image data directly from an image reading device to a service providing device on the Internet.

20 Claims, 15 Drawing Sheets

FIG. 6

SERVICE: SERVICE A  CASE BINDING
USERNAME: kadowaki
SELECT ITEMS WITH THE UP AND DOWN KEYS, AND
SELECT VALUES WITH THE LEFT AND RIGHT KEYS.
PLACE YOUR TENTATIVE ORDER OR ACTUAL ORDER
WHEN YOU HAVE FINISHED.

| | |
|---|---|
| CONNECTION SERVICE | SERVICE A   User ID: 0123456 |
| DOCUMENT SIZE | A4 |
| NUMBER OF PAGES | 20 |
| SIZE OF PRINTING SHEET | A4 ▼ |
| BOTH-SIDED/ SINGLE-SIDED | BOTH-SIDED ▼ |
| COLOR/BW | COLOR ▼ |
| NUMBER OF COPIES | 1 ▼ |
| BINDING | CASE BINDING ▼ |
| DELIVER TO | KADOWAKI AT DESIGN DIVISION C, BLDG B, FACILITY A   TEL 9999 |
| PAID FOR BY | DIVISION CODE 1111 |
| ORDERED BY | KADOWAKI, DESIGN DIVISION C TEL 9999 |

[ TENTATIVE ORDER ]   [ ORDER ]   [ END ]

FIG. 7

| | | 10 |
|---|---|---|
| E-MAIL ADDRESS | kadowaki@xxxxx.co.jp | |
| USERNAME | kadowaki | |
| DELIVER TO | KADOWAKI AT DESIGN DIVISION C, BLDG B, FACILITY A  TEL 9999 | |
| PAID FOR BY | DIVISION CODE 1111 | |
| ORDERED BY | KADOWAKI, DESIGN DIVISION C TEL 9999 | |

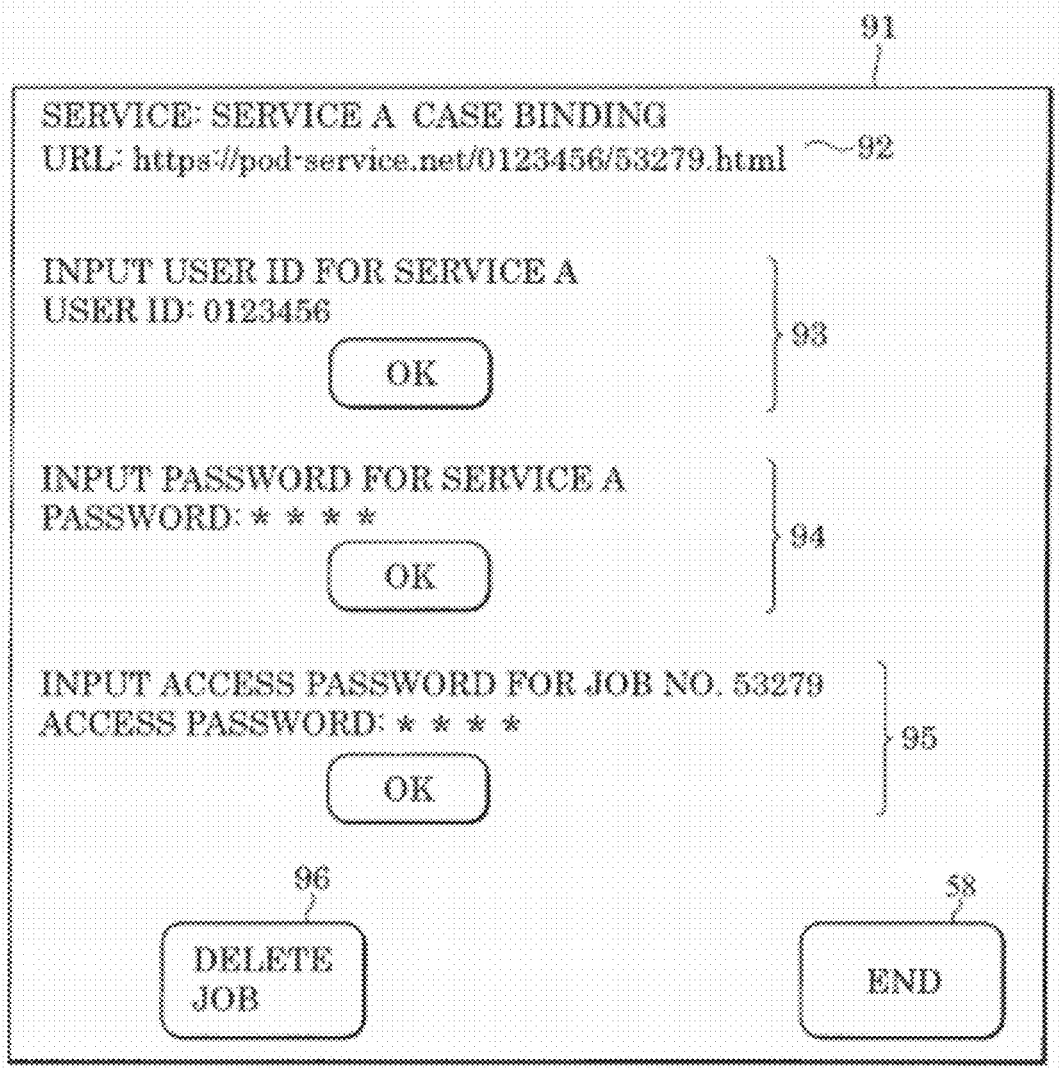

FIG. 10

| | | |
|---|---|---|
| SERVICE: SERVICE A CASE BINDING<br>URL: https://pod-service.net/0123456/53279.html | | |
| CONNECTION SERVICE | SERVICE A User ID: 0123456<br>TENTATIVE ORDER | |
| DOCUMENT SIZE | A4 | |
| NUMBER OF PAGES | 20 | |
| SIZE OF PRINTING SHEET | A4 | ▼ |
| BOTH-SIDED/<br>SINGLE-SIDED | BOTH-SIDED | ▼ |
| COLOR/BW | COLOR | ▼ |
| NUMBER OF COPIES | 1 | ▼ |
| BINDING | CASE BINDING | ▼ |
| DELIVER TO | KADOWAKI AT DESIGN DIVISION<br>C, BLDG B, FACILITY A TEL9999 | ▼ |
| PAID FOR BY | DIVISION CODE 1111 | ▼ |
| ORDERED BY | KADOWAKI, DESIGN DIVISION C<br>TEL9999 | |

DELETE JOB ~96   ORDER ~104   END ~58

91

FIG. 13A  FIG. 13B  FIG. 13C  FIG. 13D
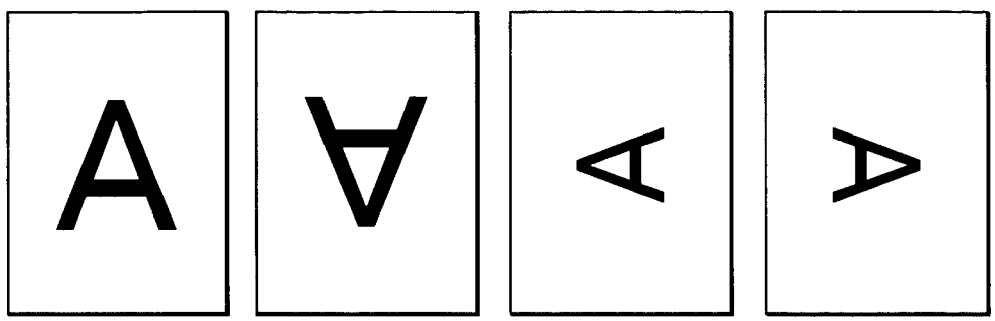
FIG. 13E  FIG. 13F  FIG. 13G
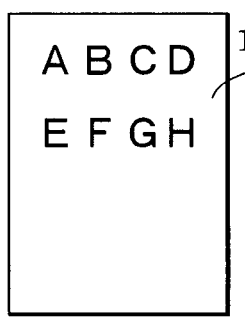 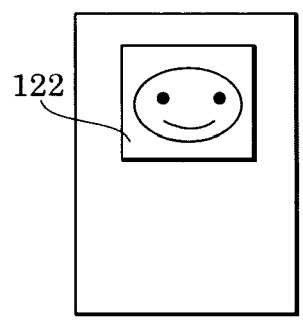 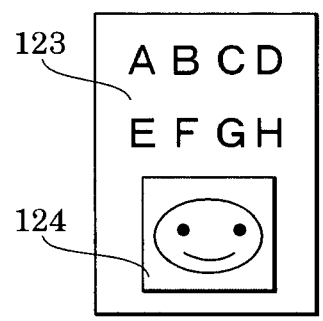
FIG. 13H  FIG. 13I
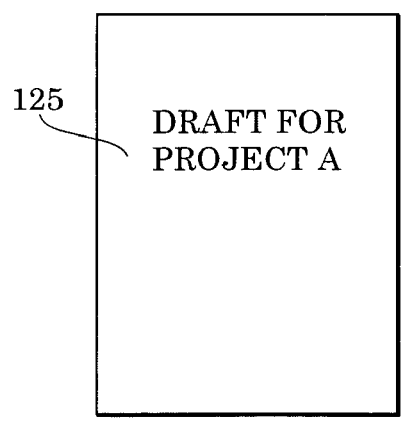 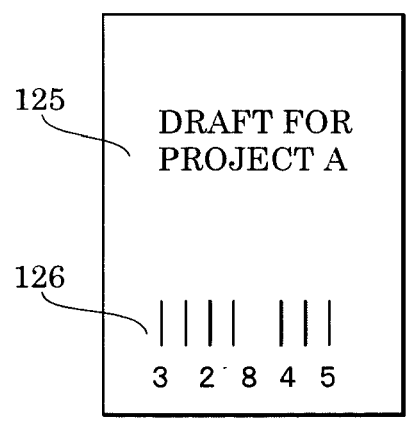

SERVICE TENTATIVE ORDER REPORT

SERVICE: PRINTING AND BINDING SERVICE A
User ID: Device0865 } 142
URL: https://pod-service.net/Device0865

Job ID: 53280 ~143

ACCESS PASSWORD: 229933 ~144

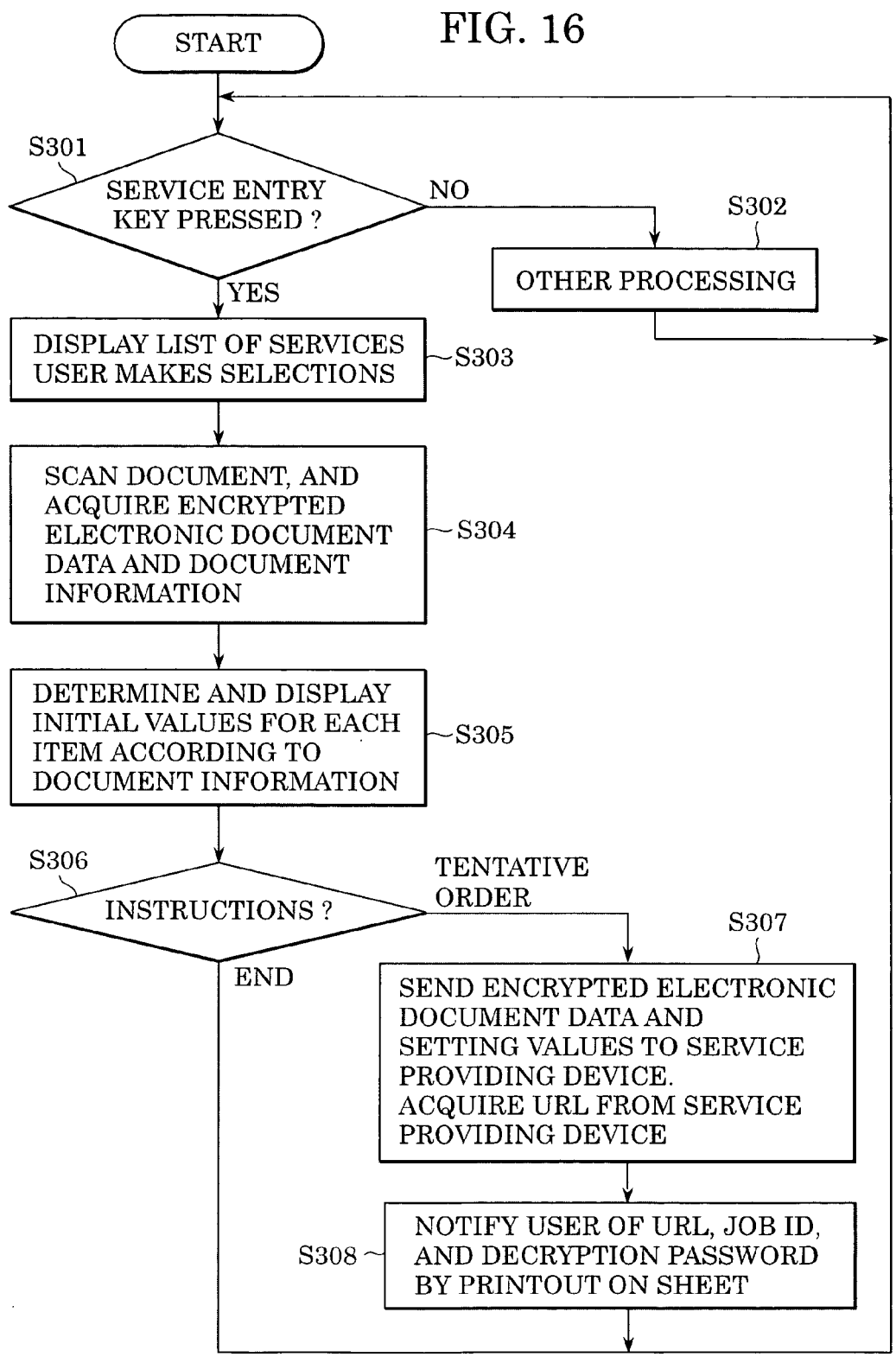

FIG. 17

| | | |
|---|---|---|
| SERVICE: SERVICE A CASE BINDING | | |
| URL: https://pod-service.net/Device0865 | | |
| Job ID: 53280 | | |

| | | |
|---|---|---|
| CONNECTION SERVICE | SERVICE A  User ID: 0123456 | |
| DOCUMENT SIZE | A4 | |
| NUMBER OF PAGES | 16 | |
| ORIENTATION OF DOCUMENT | LANDSCAPE (UPPER LEFT) | ▼ |
| DOCUMENT TYPE | TEXT AND PHOTOGRAPHS INCLUDED | ▼ |
| DOCUMENT TITLE | DRAFT FOR PROJECT A | ▼ |
| DOCUMENT ID | 32845 | ▼ |
| SIZE OF PRINTING SHEET | A4 | ▼ |
| BOTH-SIDED/ SINGLE-SIDED | BOTH-SIDED | ▼ |
| COLOR/BW | COLOR | ▼ |
| BINDING | SADDLE STITCHING BINDING | ▼ |
| NUMBER OF COPIES | 1 | ▼ |
| DELIVER TO | KADOWAKI AT DESIGN DIVISION C, BLDG B, FACILITY A TEL9999 | ▼ |
| PAID FOR BY | DIVISION CODE 1111 | ▼ |
| ORDERED BY | KADOWAKI, DESIGN DIVISION C TEL9999 | |

[ DELETE ]  [ TRANSFER TO OTHER JOB ]  [ ORDER ]  [ END ]

PRINTING SERVICE ORDERING SYSTEM AND ORDERING METHOD

BACKGROUND OF THE INVENTION

1. Field of the Invention

The present invention relates to a service ordering providing system, an image reading device, an information processing device, a service ordering method, and a program, and more specifically, it relates to a service ordering providing system comprising an image reading device and information processing device and service providing device that are each connected via a network, an image reading device and information processing device that make up this service ordering providing system, a service ordering method applied to the aforementioned service ordering providing system, and a program for executing this service ordering method on a computer.

2. Description of the Related Art

Conventionally, in the case of using a printing service provided on the Internet, a Web browser is started on a client terminal such as a PC (Personal Computer), a Web server which, is a printing service providing device on the Internet, is accessed, and the documents to be printed are sent to this Web server as the order for printing (for example, see Japanese Patent Laid-Open No. 11-007365).

However, using the above conventional method, two operations have been necessary, namely an image reading device reading an original document (hereafter may be simply referred to as "document") on a sheet and the read electronic data being sent to the PC of the user, and the electronic data being sent from the PC to the Web server, causing additional work.

Further, identical read electronic data is sent over the network twice, from the image reading device to the PC and from the PC to the Web server, and therefore a greater burden is placed on the network, and further, the time required to send these transmissions or the waiting time of the user becomes longer.

Now, in order to avoid sending identical data over the network twice, a solution can be conceived such as directly sending the read image data from the image reading device to the Web server, but this poses the following problems:

1) an image reading device is a device shared by multiple users, and therefore provides an operation screen shared by multiple users, and has less functional operability as compared to sending electronic data from the PC of an individual; and 2) the operation screen of an image reading device is smaller compared to that of a PC, and because it almost always has no keyboard or pointing device (mouse), the operability of accessing a Web server on the Internet using the operating unit of the image reading device is less functional when compared to accessing the Web server using a PC.

SUMMARY OF THE INVENTION

The present invention improves the operational functionality in the case of sending read image data directly from an image reading device to a service providing device on the Internet.

According to an aspect of the present invention, an image reading device reads an original document image and generates original document data, and sends a job made up of the generated original document data and first information necessary for processing to be performed at a service providing device based on this original document data, to the service providing device. The image reading device also notifies an information processing device, of the job identification information of the job that has been sent. The information processing device acquires the job identification information notified and sends, to the service providing device, second information necessary for the processing to be performed at the service providing device relating to a job corresponding to the job identification information.

Further features and advantages of the present invention will become apparent from the following description of the embodiments taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram illustrating one example of the ordering screen (service setting operation screen), displayed on the liquid crystal display unit having the touch panel within the operating unit, after the screen illustrated in FIG. 5.

FIG. 7 is a diagram illustrating one example of the operator information stored in an IC (integrated circuit) card.

FIG. 9 is a diagram illustrating one example of the authentication screen on the Web, displayed on the display screen of this PC when the user PC accesses the URL notified by a tentative order.

FIG. 10 is a diagram illustrating the setting values of various types of setting items relating to a job with job number 53279, displayed on the display screen of the user PC.

FIG. 13 is a diagram illustrating the extracted information of each document extracted by the document analyzing unit of the control unit, from the document data read by an image reading unit.

FIG. 15 is a diagram illustrating a service tentative order report.

FIG. 16 is a flowchart illustrating the procedure for the document-reading/tentative-ordering-processing executed in the control unit of the image reading device according to the second embodiment.

FIG. 17 is a diagram illustrating the Web screen on the user PC in which setting values of various types of setting items relating to job ID 53280 are displayed.

DESCRIPTION OF THE EMBODIMENTS

Exemplary embodiments of the present invention will now be described in detail in accordance with the accompanying drawings.

First Embodiment

Figure 1:
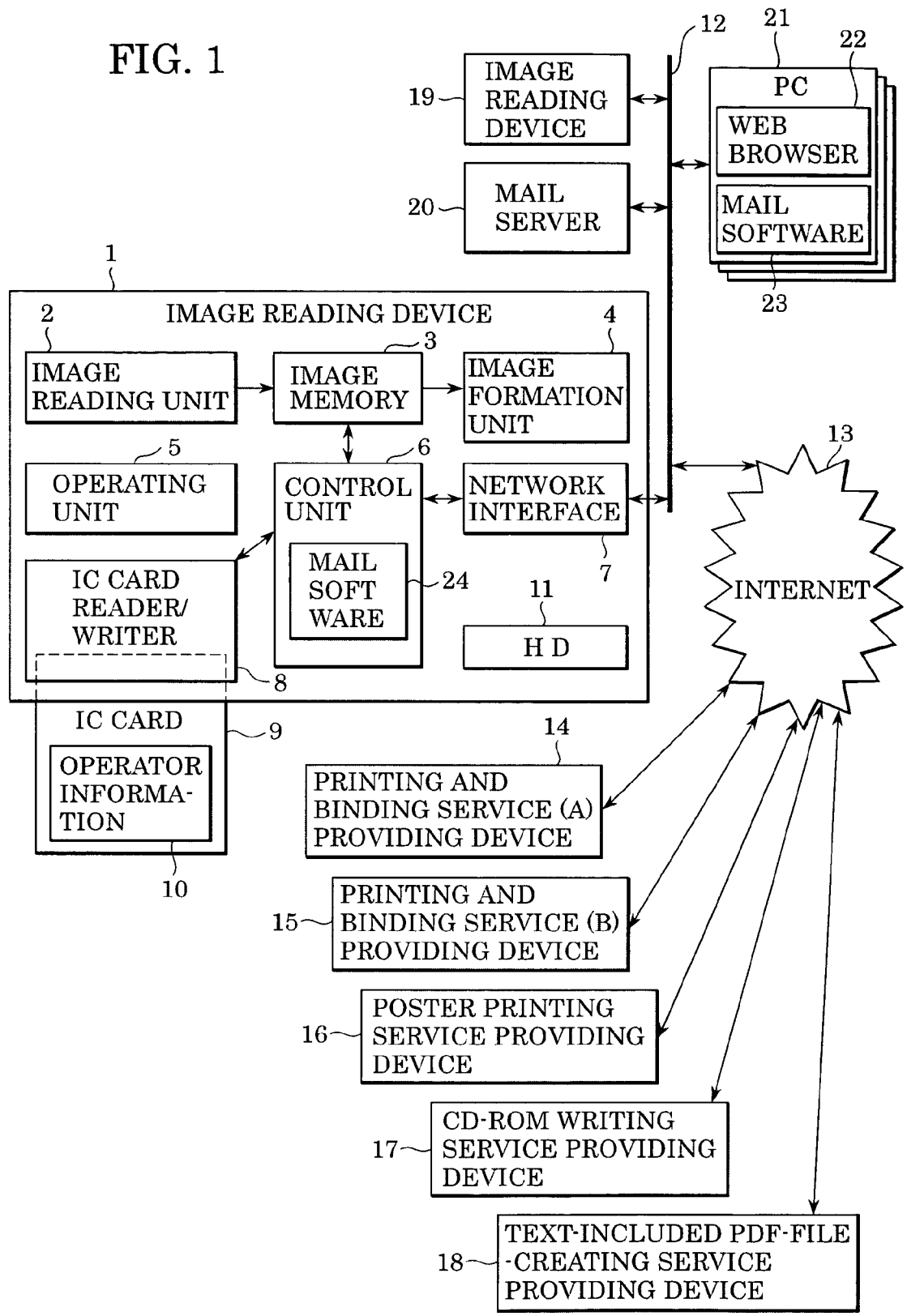
FIG. 1 is a block diagram illustrating the configuration of a service ordering providing system according to a first embodiment relating to the present invention.

FIG. 1 is a block diagram illustrating the configuration of a service ordering providing system according to a first embodiment relating to the present invention.

This service order providing system includes an image reading device 1, an image reading device 19, multiple PCs (information processing devices) 21, and a mail server 20, which are each connected to an intranet 12; and various types of service providing devices 14 through 18 which are connected to the Internet 13. The intranet 12 is connected to the Internet 13.

At the image reading device 1, an image reading unit 2 reads the sheet document, and the read image data is written to image memory 3. After that, the image data is read from the image memory 3, and is sent to the various service processing devices 14 through 18, via a control unit 6, a network interface 7, the intranet 12, and the Internet 13, and the corresponding service order is placed.

Of the various service processing devices 14 through 18, the printing and binding service (A) providing device 14 receives the image data read by the image reading devices 1 and 19, or the document data created by a PC (not shown), prints based on these data, subjects the printouts to binding processing, such as case binding, and performs the service of delivering the finished product to the specified address by home delivery service and so forth.

The printing and binding service (B) providing device 15 provides service similar to that of the printing and binding service (A) providing device 14, but is a service provided by another company, and so the service fees, lineup of the binding services, delivery date and so forth differ from those of the printing and binding service (A) providing device 14.

The poster printing service providing device 16 receives the image data read by the image reading devices 1 and 19, or the document data created by the PC (not shown), performs large sheet printing such as on size A1 sheets based on the data, subjects the printouts to laminating processing and so forth to create posters, and performs the service of delivering the finished product to the specified address by home delivery service and so forth.

The CD-ROM writing service providing device 17 receives the image data read by the image reading devices 1 and 19, or the document data created by the PC (not shown), writes this data to a CD-ROM (compact disk-read-only memory) or DVD (digital versatile disk), and performs the service of delivery to the specified address by home delivery service and so forth.

The text-included PDF-file-creating service providing device 18 receives the image data read by the image reading devices 1 and 19, or the document data created by the PC (not shown), converts this to text-included PDF data, and performs the service of delivering this data to the specified address by home delivery service and so forth or by sending through e-mail.

In addition to the above mentioned image reading and transmission, the image reading device 1 includes a copy function. In other words, the image reading unit 2 reads a sheet document, and the read image data is written to the image memory 3. After that, the image data is read out of the image memory 3, sent to an image formation unit 4, and a copy image is formed.

Further, the image reading device 1 includes a printing function. In other words, the text data or image data received from the various service providing devices 14 through 18 on the Internet 13, via the Internet 13, the intranet 12, the network interface 7, and the control unit 6, is rendered as necessary, and written to the image memory 3 as image data, and this is read out as an image by the image formation unit 4.

The operating unit 5 of the image reading device 1 is an input device for the user to perform various operating instructions, and in addition to various settings for copying and various settings for image reading, this operating unit 5 is also used for various settings in the case of using various services on the Internet 13.

The hard disk device (HD) 11 stores programs to be executed on the image reading device 1 or document data or other various data.

The IC card writer 8 writes data to the IC card 9 (which is a detachable storage medium) or reads data from the IC card 9. Operator information 10 regarding the user that is the holder of this IC card is stored on the IC card 9.

The control unit 6 controls the entire image reading device 1, and includes mail software 24. The mail software 24 is software for sending e-mail to other equipment on the network and receiving e-mail from other equipment on the network, via an external mail server 20.

The image reading device 1 is a device shared and used by multiple users. Multiple PCs 21 are each used by individual users. The multiple PCs 21 each have installed therein a mail software program 23 and a Web browser 22. The Web browser 22 is software for browsing the various Web screens provided by the various service providing devices 14 through 18 on the Internet 13. Also, the image reading device 19 has a configuration similar to that of the image reading device 1.

Figure 2:
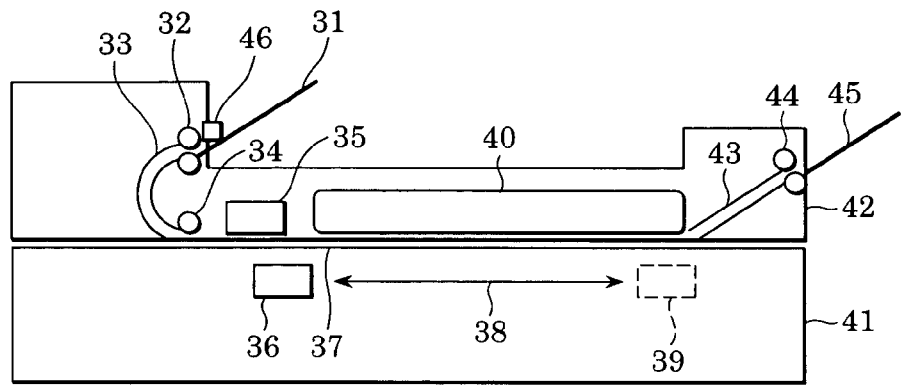
FIG. 2 is a cross-sectional diagram illustrating the internal configuration of an image reading unit of an image reading device.

FIG. 2 is a cross-sectional diagram illustrating the inner configuration of the image reading unit 2 of the image reading device 1. This cross-sectional diagram illustrates the image reading unit 2 with the document sheet supply unit 42 for reading the sheet documents in a closed state with respect to the main unit 41. In the case of reading a book document, the document sheet supply unit 42 is raised up from the main unit 41 and the document is placed face down on the document stacking unit 37, and then the document sheet supply unit 42 is lowered and the document is pressed down. In this way, reading is performed by scanning the first image reading unit 36 through to the read end position 39, as indicated by arrow 38 by means of a drive system (not shown). The first image reading unit 36 includes a light source (not shown), and an image reading element such as a CCD (charge-coupled device) and an optical system. The light emitted from the light source is transmitted through the document stacking unit 37, which is made of glass, is reflected off of the document, and the reflected light is read with the image reading element, thus performing the reading of the image data. The CPU within the control unit 6 is capable of detecting whether or not a document is on the document stacking unit 37, based on an output signal from a sensor (not shown).

On the other hand, in the case of reading a sheet document, the sheet document having one or more sheets is placed on a document sheet supply stacking unit 31. The CPU within the control unit 6 is capable of detecting whether or not a document is on the document sheet supply stacking unit 31, based on an output signal from a sensor 46. The document placed on the document sheet supply stacking unit 31 is supplied one sheet of paper at a time from the very top of the sheet document with multiple sheets, by means of a roller 32, guide 33, and roller 34. The sheet then passes in front of the second image reading unit 35 and the first image reading unit 36, and is discharged into the document sheet discharge unit 45, by means of a sheet-shaped roller 40, a guide 43, and a roller 44.

The image of a single-sided document or the first side of a both-sided document (the side facing upwards when placed on the document sheet supply stacking unit 31) is read by the first image reading unit 36 at the same time that the document passes through. On the other hand, the image of the second side of a both-sided document (the side facing downwards when placed on the document sheet supply stacking unit 31) is read by the second image reading unit 35 at the same time the document passes through. The second image reading unit 35, which is similar to the first image reading unit 36, is made up of a light source (not shown) and an image reading element such as a CCD and an optical system, but is used in a fixed position, unlike the first image reading unit 36.

In the case of reading in a sheet document with multiple pages, the sheets are supplied one at a time, reading is performed and the sheets are discharged. After the last document sheet is supplied, the sensor 46 detects that the document is gone, and the image reading device 1 can recognize the number of sheets of the document. Further, using the first image reading unit 36, the size of the document that passes in front of the first image reading unit 36 can be recognized. The size of the document is for example, A4 size or A3 size or LTR (letter) size. Further, from the values of the image data read from the first image reading unit 36 or the second image reading unit 35, the document can be recognized as a color document or a monochrome (BW) document. Further, from the values of the image data read from the first image reading unit 36 or the second image reading unit 35, the document can be recognized as a single-sided document or a both-sided document.

According to the present embodiment, the document size, color or BW document differentiation, and single-sided or both-sided document differentiation is automatically recognized based on the image data read by the first image reading unit 36 or the second image reading unit 35; however, another embodiment may be made in which the user specifies these before the image is read in. The former has the advantage of not requiring the additional work of the user selecting the settings because automated recognition is made. The latter has the advantage of avoiding recognition errors, and further, the user may make specifications other than those that would be recognized automatically, such as specifying that a color document should be read in BW.

Figure 3:
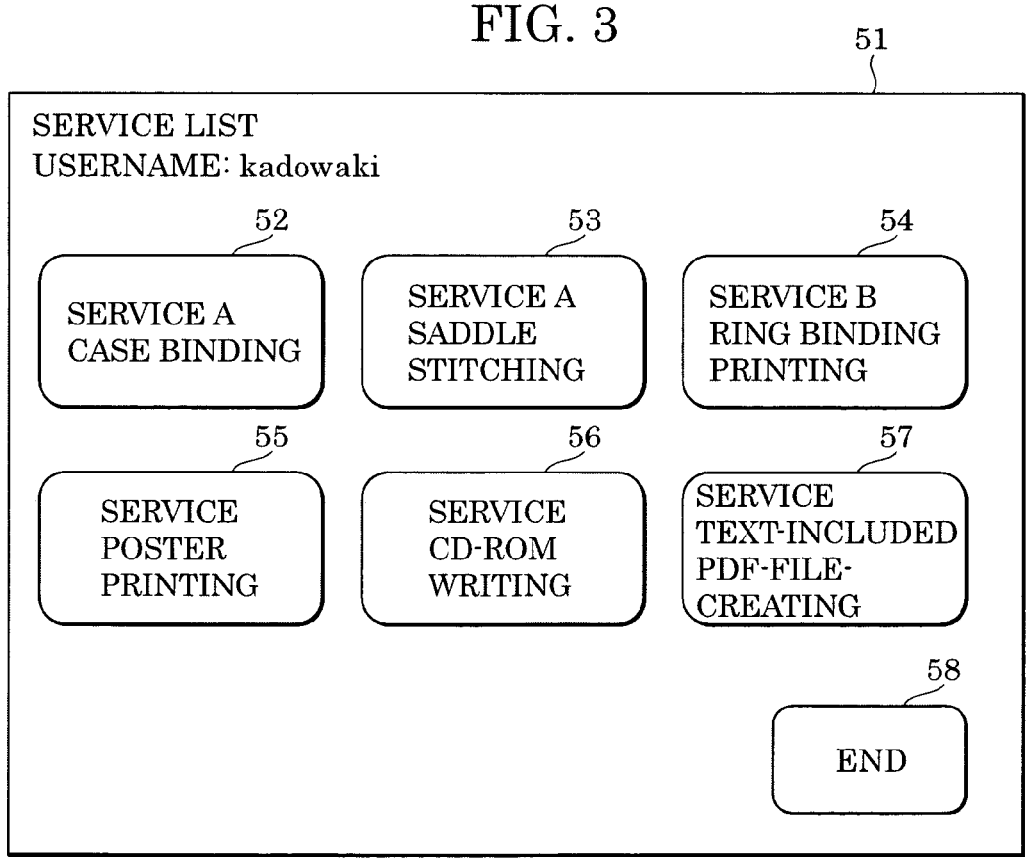
FIG. 3 is a diagram illustrating one example of the service list screen displayed on a liquid crystal display unit having a touch panel within an operating unit.

FIG. 3 is a diagram illustrating one example of the service list screen displayed on the liquid crystal display unit 51 having a touch panel within the operating unit 5. This screen is the service list screen displayed on the liquid crystal display unit 51 having a touch panel within the operating unit 5, in the case that a user with the username of "kadowaki" has placed a personal IC card in the image reading device 1 and pressed a service entry key, (not shown), within the operating unit 5.

This screen is displaying six services, 52 through 57. The service 52 corresponds to the service provided by the printing and binding service (A) providing device 14, and based on the sheet document read by the image reading device 1, this performs the service of printing, performing case binding, and delivery. In general, finishing processes, such as stapling, can be performed using a stapling device attached to a multifunction printer (MFP) located in an office, but for binding processing such as case binding, dedicated binding equipment for gluing, and trimming equipment for trimming the edges after binding is required, and therefore performing case binding in an office is difficult. Therefore, this type of binding processing is ordered out to another company via the Internet, and the service 52 handles this requirement.

The service 53 also corresponds to the service provided by the printing and binding service (A) providing device 14, and based on the sheet document read by the image reading device 1, this performs the service of printing, performing saddle stitching, and delivery. Some recent multifunctional printers (MFP) have the function for saddle stitching, but the number of pages that can be handled for saddle stitching is around sixteen pages, for example, and in many cases documents with many pages cannot be handled. Therefore, when saddle stitching is desired for a document of around thirty-two pages, for example, this must be ordered out to another company via the Internet, and the service 53 handles this requirement.

The service 54 corresponds to the service provided by the printing and binding service (B) providing device 15, and based on the sheet document read by the image reading device 1, this performs the service of printing, performing ring binding, and delivery. In general, ring binding is difficult to perform with equipment located in an office, and therefore this type of binding is ordered from an external company via the Internet, and the service 54 handles this requirement.

The service 55 corresponds to the service provided by the poster printing service providing device 16, and based on the sheet document read by the image reading device 1, this performs the service of poster printing on A1 size sheets and delivery. In the case in which the office does not have A1 size printer or in the case in which specialized processing is desired, such as laminating processing following printing, this is ordered out to another company via the Internet, and the service 55 handles this requirement.

The service 56 corresponds to the service provided by the CD-ROM writing service providing device 17, and this performs the services of writing the sheet document data read by the image reading device 1 to a CD-ROM or DVD, and delivering to a specified address using home delivery service and so forth.

The service 57 corresponds to the service provided by the text-included PDF-file-creating service providing device 18, and this performs the services of converting the sheet document data read by the image reading device 1 into a text-included PDF file, and delivering to a specified address using home delivery service or e-mail transmission or the like.

These six services are registered in advance on the image reading device 1. The user selects the desired service from the service list illustrated in FIG. 3, and the corresponding service order is placed by touching the display portion of this service.

Figure 4:
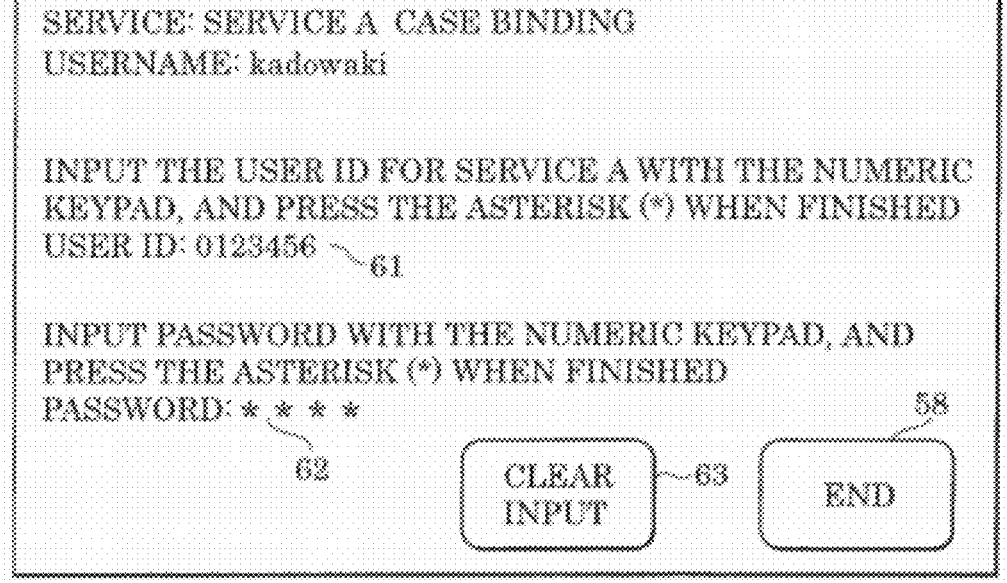
FIG. 4 is a diagram illustrating one example of the operation screen used for authentication, displayed on the liquid crystal display unit having the touch panel within the operating unit, in the case wherein for example service 52 is selected, according to FIG. 3.

FIG. 4 is a diagram illustrating one example of the operation screen used for authentication, displayed on the liquid crystal display unit 51 having a touch panel within the operating unit 5, in the case in which the service 52, for example, is selected, according to FIG. 3.

The selected service name and the holder name of the attached IC card are displayed on the upper portion of the liquid crystal display unit 51, and on the lower portion thereof a prompt is displayed requiring the user to input the user ID necessary for accessing the printing and binding service (A) providing device 14 that provides the service 52 (service A).

When the user inputs the user ID utilizing a numerical keypad (not shown) of the operating unit 5, this is displayed at a location on the screen 61, and further pressing an end key, for example an asterisk (*) key (not shown), of the operating unit 5 finalizes the input user ID.

Additionally, on the lower portion thereof, a prompt is displayed requiring the user to input the password necessary for accessing the printing and binding service (A) providing device 14. Upon the user inputting the password using the numerical keypad of the operating unit 5, this is displayed in a location on the screen 62 in masked form, for example using asterisks, and further when the end key, e.g., asterisk (*) key, of the operating unit 5 is pressed, the input password is finalized.

The input clear key 63 is a key for clearing the input values of the user ID or the password. Further, the end key 58 is a key for ending this screen (returning to the previous screen).

When the user ID and password is input in the screen illustrated in FIG. 4, these are sent to the printing and binding service (A) providing device 14 that provides the service 52 (service A), the user authentication is performed. Upon authentication, the screen illustrated in FIG. 5 is displayed on the liquid crystal display unit 51 having a touch panel within the operating unit 5.

Figure 5:
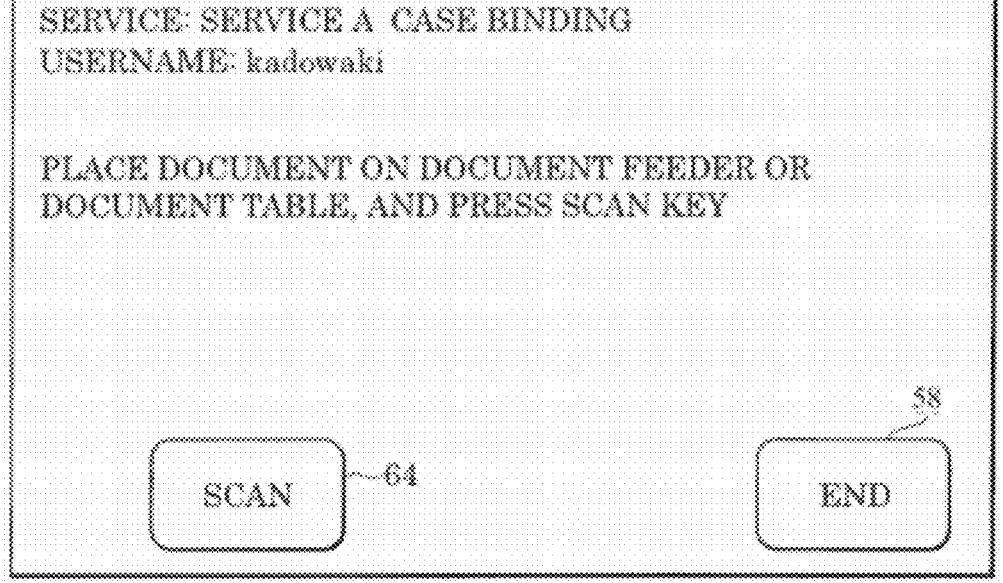
FIG. 5 is a diagram illustrating one example of the operation instruction screen for document reading, displayed on the liquid crystal display unit having the touch panel within the operating unit, after the screen illustrated in FIG. 4.

FIG. 5 is a diagram illustrating one example of the operation instruction screen for the purpose of document reading, displayed on the liquid crystal display unit 51 having a touch panel within the operating unit 5 following the screen illustrated in FIG. 4.

The user follows the instructions displayed on this operation instruction screen, and in the event that the document is a sheet document, places the document on the document sheet supply stacking unit 31, and in the case of a book document, places it on the document stacking unit 37. Then, upon the scan key 64 being pressed, document reading is performed.

Upon the scan key 64 being pressed on the screen illustrated in FIG. 5, the screen illustrated in FIG. 6 is displayed on the liquid crystal display unit 51 having a touch panel within the operating unit 5.

FIG. 6 is a diagram illustrating one example of the ordering screen (service setting operation screen), displayed on the liquid crystal display unit 51 having a touch panel within the operating unit 5 following the screen illustrated in FIG. 5.

The user uses the screen illustrated in FIG. 6 to, for example, confirm the various setting content for placing an order to the printing and binding service (A) providing device 14, change the content thereof as necessary, and place a tentative order or an actual order.

In FIG. 6, the selected service name, the holder name of the attached IC card, and a guide for the method of changing the various service setting items are displayed at a location on the screen 71, the labels for the various service setting items are displayed at another location on the screen 72 of the screen, and the setting values corresponding to those values are displayed at yet another location on the screen 73.

The setting values for the various service setting items illustrated as an example in FIG. 6 are described below. First, the setting value for the connection service is the printing and binding service (A) providing device 14 selected on the screen illustrated in FIG. 3, and the setting value for the document size is set as A4 as a result of the automatic detection from the image reading unit 2, and the number of document pages are also set at 20 pages as a result of the automatic detection. The printing paper size has a greater probability of being A4 size because the document size is A4, and so is set as A4. Regarding whether to use single-sided printing or both-sided printing, if the document is printed both-sided the probability is greater for both sides to be printed, so both-sided printing is set. Regarding whether to use color printing or BW printing, if the automatic detection result is color, the probability is greater for color printing, so color printing is set. The number of copies is automatically set for one copy as the default value. The setting value for binding is the case binding selected on the screen illustrated in FIG. 3. The delivery address is addressed to the user, and the billing party when using this service, in other words the billing address for payment is the department of the user, and the order placer is named as the user. These items, such as the user delivery address, billing party, and order placer name, are listed in the operator information 10 within the IC card, as will be described with reference to FIG. 7.

As described above, some of the setting values of the various setting items are automatically set based on the results of the size or page number of the document being automatically detected, and other setting values are automatically set to the setting value assumed to be used most frequently when printing based on the attributes of the document, such as single-sided/both-sided, and other setting values are automatically set to the personal information listed within the individual IC card, and yet other setting values are automatically set using default values. This automatic setting of values to be used as defaults prevents the user from having the additional work of inputting these values. However, since these automatic settings are used as defaults, the user can change the setting values if desired.

Next, keys for changing the values of the various setting items are displayed in a location on the screen 74. Selecting a key to be changed using the up and down keys (not shown) of the operating unit 5, the selected key is displayed in inverse, and when the left and right keys (not shown) are pressed in this situation, another candidate setting value is displayed at the portion to be changed of the third location 73.

In the example illustrated in FIG. 6, at the point in time of user authentication by the screen illustrated in FIG. 4, the image reading device 1 is connected to the printing and binding service (A) providing device 14, and therefore in the case that any of the keys (at screen location 74) are selected, other candidate setting values for the various setting items are obtained, by inquiring with the printing and binding service (A) providing device 14. Now, the document size and number of document pages are automatically determined based on the document, and therefore are not capable of being changed. Further, regarding the delivery address or the billing party or the order placer, this type of personal information is difficult to input on the small display screen of the operating unit 5 of the image reading device 1, particularly without being able to use a keyboard or a mouse. Therefore in various embodiments, this information is not capable of being changed.

After the setting values of the various setting items are changed as necessary, when the order key 76 is pressed, the document data read by pressing the scan key 64 in FIG. 5 and the various setting values set in FIG. 6 are sent to the service providing device specified on the Internet 13, and an order is placed.

When placing an order to receive a service, ordering can be made simply by pressing the order key 76. This includes the case where a change has been made to one or more of the setting values that were automatically set based on the document information and so forth.

On the other hand, after the setting value of each setting item has been changed as necessary, when the tentative order key 75 is pressed, the document data read by pressing the scan key 64 in FIG. 5 and the various setting values set in FIG. 6 are sent to the service providing device specified on the Internet 13, and a tentative order is placed. A tentative order sends the document data and the various setting values for the service to the service providing device, but the order is held, and a tentative order is used in the case as described below, wherein one portion of the various setting values are to be changed using the user PC. For example, in the case that the delivery address is not the actual user, but delivery is actually to multiple places, e.g., delivery is to five different places, the operation would be time-consuming if the input of the address and so forth of each of those five delivery addresses were performed using the operating unit 5 of the image read device 1. Furthermore, if the image reading device 1 is shared with other users, such time-consuming user entry would prohibit user by others for a significant amount of time. In order to avoid this, the tentative order is placed in advance, and at a later time the PC is used to change the delivery addresses and place the actual order.

The exemplary screen illustrated in FIG. 6 is a display screen with a list menu for simplification of explanation. A screen, using settings similar to those in FIG. 6, can be a Web screen generated with HTML and so forth, provided by the service providing device on the Internet 13 for use for performing the settings.

The operating screen illustrated in FIG. 6 has the advantage of being able to display only the necessary setting items, and has the advantage of the image reading device 1 not needing to load a Web browser. On the other hand, the case in which the setting operations are performed with a Web screen has the advantage of the same operational functionality as operating with a PC. Further, instead of displaying a Web screen with HTML and so forth, the items capable of being set with that service and the list of the setting values capable of being set for each item can be obtained in one batch from the service providing device on the Internet, in a form such as XML. Based on this, the screen corresponding to the screen illustrated in FIG. 6 can be displayed on the side of the image reading device. In this case, the advantage is that inquiring the suggested setting values of the Web server is not necessary each time the setting values are changed.

FIG. 7 is a diagram illustrating one example of the operator information 10 stored in an IC card. The operator information 10 lists the e-mail address of the holder of this IC card as the e-mail address, the IC card holder name as the username, the office location of the IC card holder as the delivery address, the organization code to which the holder of this IC card belongs as the billing party, and the IC card holder name as an order placer. This information differs with each user, but is information that generally does not vary for the same user.

Figure 8:
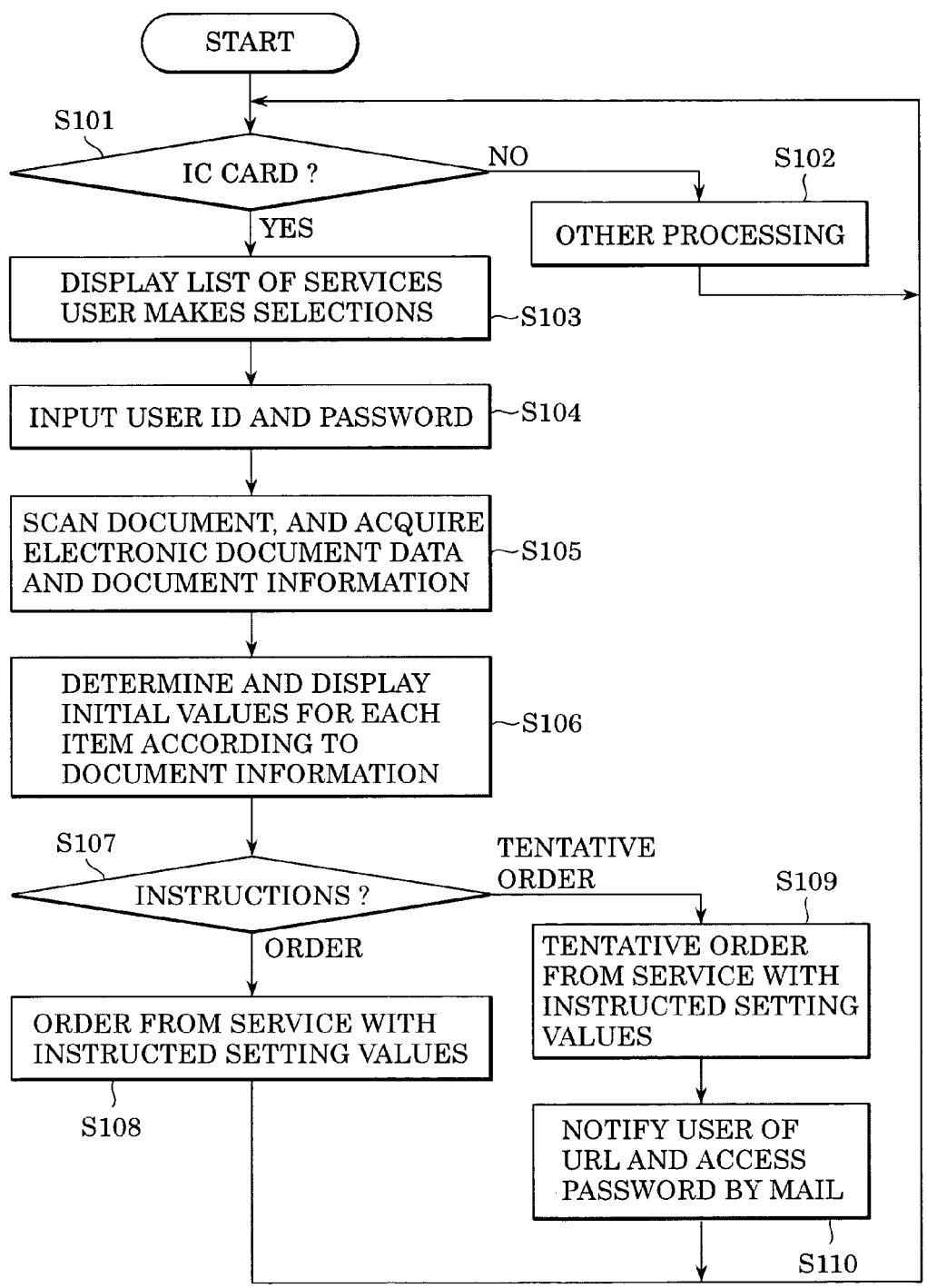
FIG. 8 is a flowchart illustrating the procedure for the document reading/ordering processing executed in the control unit of the image reading device according to the first embodiment.

FIG. 8 is a flowchart illustrating the procedure for the document-reading/ordering-processing executed in the control unit 6 of the image reading device 1 according to the first embodiment.

When this process is started, first, is step S101, it is determined whether the IC card 9 is mounted. If the IC card 9 is not mounted, the flow continues to step S102 and performs another process, then returns to step S101. If the IC card 9 is mounted, the flow continues to step S103.

In Step S103, the service list screen illustrated in FIG. 3 is displayed, and processing waits for the user to select one of the services. Upon one of the services being selected, in step S104, the authentication screen illustrated in FIG. 4 is displayed, and processing waits for the user to input the user ID and password to be used for the selected service. When that is input, the user ID and password are sent to the service providing device that provides the service selected in step S103, and user authentication is performed.

In the case of authentication, in step S105, the operation instruction screen illustrated in FIG. 5 is displayed, the original document is read according to the user instructions, and further, according to that reading process, the document information is acquired, such as the size of the document text, the number of document pages, single-sided document/both-sided document differentiation, and color document/BW document differentiation.

In Step S106, the setting values of each setting item on the order screen illustrated in FIG. 6 are determined, based on the acquired document information, and displayed on the order screen in FIG. 6. Changes to the setting values input by the user are accepted as necessary.

In Step S107, processing waits for the order instructions or tentative order instructions from the user. In the case when an order has been instructed, processing continues to step S108 and sends the image data read in step S105 (document electronic data) and the various setting values that were decided and changed in step S106 to the service providing device specified on the Internet 13 as one job and places the order, processing then returns to step S101.

On the other hand, when a tentative order has been instructed in step S107, processing continues to step S109 and sends the image data read in step S105 (document electronic data) and the various setting values that were decided and changed in step S106 to the service providing device specified on the Internet 13 as one job and places the tentative order. The service providing device that received the tentative order returns the URL and access password for the PC, regarding the job received and saved by the service providing device, to the document reading device 1. In the next step S110, the document reading device 1 sends the URL and access password received from the service providing device to the user PC, utilizing the mail software 24, then processing returns to step S101.

The present invention is configured to send the password to access the saved job from the service providing device to the image reading device side, but instead of this, this password can be sent from the image reading device side to the service providing device side. The former has the advantage of avoiding the additional work to produce a password on the image reading device side, and the latter has the advantage of specifying a password at will on the image reading device side.

Now, the user PC, which has received the URL and access password for accessing the job saved on the service providing device from the document reading device 1 via e-mail through a tentative order, starts the Web browser 22, and accesses the URL as instructed. By doing so, the PC displays a Web authentication screen 91 as illustrated in FIG. 9. FIG. 9 is a diagram illustrating one example of the authentication screen 91 of the Web displayed on the display screen of this PC when the user PC accesses the URL notified by a tentative order. A location 92 on this Web authentication screen displays the accessed URL.

According to the above-described example, the printing and binding service (A) providing device 14 saves the job sent from the image reading device 1 to the folder provided for each user, assigning a uniform number for each job. The job of the above mentioned tentative order is assigned job number 53279, and saved in the user folder for user ID 0123456.

Then, at the authentication screen 91 illustrated in FIG. 9, the user with user ID 0123456 accesses the printing and binding service (A) providing device 14, and further user authentication is performed in the case of accessing the job with job number 53279.

First, at the prompt at location 93, the user is requested to input his/her user ID for accessing the printing and binding service (A) providing device 14. The user inputs the user ID using a PC keyboard, and clicks the OK key with a pointing device (mouse) to finalize the decision.

The user is prompted at location 94 to input the password necessary for accessing the printing and binding service (A) providing device 14. The user inputs the password using a keyboard, and clicks the OK key with a pointing device, thereby finalizing the input.

The user is prompted at location 95 to input the password necessary for accessing the job with job number 53279. The user inputs the access password sent from the document reading device 1, using a keyboard, and clicks the OK key with a pointing device, thereby finalizing the input.

The user ID, password, and access password input in this manner are sent from the PC to the printing and binding service (A) providing device 14, and authentication is performed at the printing and binding service (A) providing device 14. As a result, if authenticated, the screen illustrated in FIG. 10 is displayed on the display screen 91 of the user PC, and the setting values of the various setting items within the job with job number 53279 can be changed. The job delete key 96 illustrated in FIG. 9 is for instructing deletion of the job itself in the case that the access password has been forgotten or the like.

FIG. 10 is a diagram illustrating the setting values of each type of setting item relating to the job with job number 53279, displayed on the display screen 91 of the user PC. The various setting items illustrated in FIG. 10 are the same as the setting screen of the image reading device 1 illustrated in FIG. 6 for simplification of explanation. However, the size of the display screen of a PC is large compared to the image reading device 1, and therefore the number of setting items in FIG. 10 displayed on the PC display screen can be increased and/or more detailed descriptions of the settings can be provided compared to the number of setting items in FIG. 6. Further, the setting screen of the image reading device 1 in FIG. 6 does not allow changes to the delivery address or billing party, but the setting screen illustrated in FIG. 10 does allow such changes. This is because generally a user PC is provided with input equipment such as a keyboard or pointing device with good operational functionality, and further, the user PC has stored the various types of personal information, and so by copying and pasting that information using this input equipment, the addresses and names for multiple, e.g., ten, delivery addresses for example, can be easily input.

Further, the user PC is a device exclusive to the user, so there is no problem if this PC is used exclusively during the time of setting the setting values of the various setting items. Further, compared to an image reading device, the PC allows the user to sit in a chair in front of the PC and input operations, and easily perform the settings.

Now, regarding the document size or the number of document pages, the setting screen illustrated in FIG. 10 also does not allow changes because this is automatically determined according to the document. Regarding the setting screen illustrated in FIG. 10, after the changes are made to the necessary setting values, the actual order is placed when the order key 104 is clicked.

Figure 11:
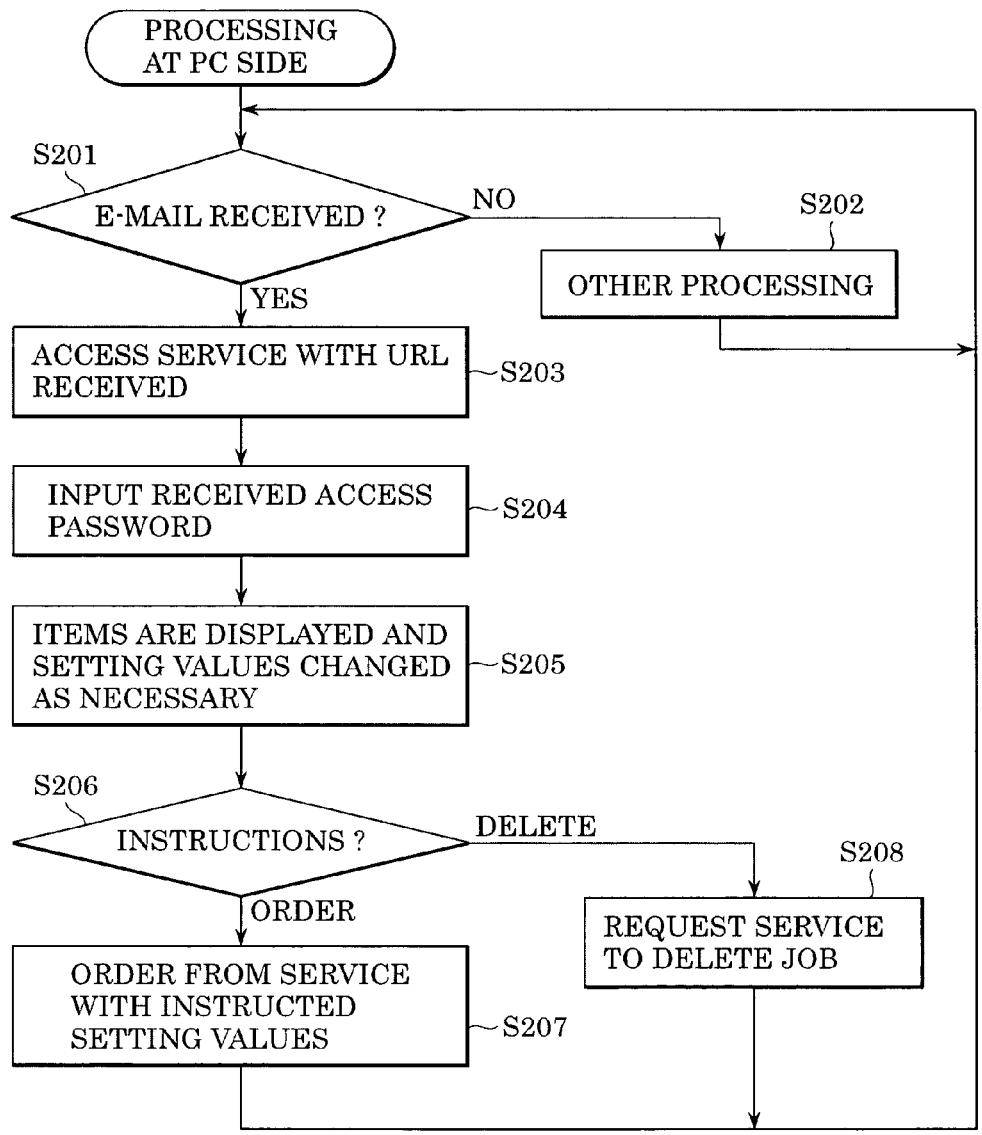
FIG. 11 is a flowchart illustrating the procedure for order processing executed on the user PC wherein the URL and access password are notified by e-mail by means of the tentative order.

FIG. 11 is a flowchart illustrating the procedure for order processing executed on the user PC in the case that the URL and access password are notified via e-mail by means of the tentative order.

In Step S201, processing waits for the e-mail sent from the image reading device 1, and if an e-mail is not received, processing proceeds to step S202 and performs another process and then returns to step S201. On the other hand, in the event that the e-mail is received from the image reading device 1, processing continues on to step S203, and using the Web browser 22, accesses the Web page provided by the service providing device that was identified in the URL listed in that e-mail. With many recent mail software programs, upon a URL written within an e-mail message being clicked on, the Web browser starts, and the Web page specified by that URL is accessed, so the Web page can be easily accessed.

After accessing the Web page provided by the service providing device identified by the URL, the Web authentication screen illustrated in the example in FIG. 9 is displayed on the display device of the user PC. In step S204, the user ID, password, and access password for the job relating to the service providing device are input. Upon authentication by the service providing device, the setting screen illustrated in the example in FIG. 10 is displayed on the display device of the user PC in step S205, and the user can change the various setting values as necessary.

Next, in step S206, processing waits for a user order instruction or job deletion instruction, using the setting screen illustrated in FIG. 10. In the case of instructions to order, the flow continues to step S207, and sends the setting values of the various setting items including the setting values changes in step S205 to the service providing device specified on the Internet 13 and places the order, then returns to step S201. On the other hand, in the case that in step S206 the flow determines there were instructions to delete, the flow continues to step S208, and makes the request to the service providing device specified on the Internet 13 for the specified job to be deleted from the jobs saved on this service providing device, and then returns to step S201.

As described above, according to the first embodiment, by sending the read document image data directly from the image reading device to the service providing device on the Internet, the document image data needs to be sent only once. Further, regarding the various setting items necessary for a service order, the setting items that can be easily set on the image reading device side can be performed on the image reading device side, and the setting items that can be easily set on the user PC (information processing device) side can be performed on the user PC side, and therefore, the various settings necessary for placing a service order can be performed easily.

The above-mentioned embodiment uses a contact-type IC card. Alternatively, a non-contact type IC card, such as a radio wave or infrared communication IC card, may be used. Further, this arrangement is not restricted to only IC cards, and other non-contact memory media, such as cellular telephones, PHSs (Personal Handyphone Systems), PDAs (Personal Digital Assistants), etc., may be used.

Further, according to the above-described embodiment, the job identification information, such as the URL or access password and so forth, was notified from the image reading device to the user PC by means of e-mail, but instead, the image reading device may be given a Web server function via which the user can obtain the job identification information on the Web screen thereof.

Second Embodiment

Next, the second embodiment relating to the present invention will be described. The configuration of the second embodiment is basically the same as the configuration of the first embodiment, and therefore, the configuration of the first embodiment will be used as a basis in describing the second embodiment.

According to the second embodiment, the user authentication method and the method for sending the read document data to the service providing device, and the job identification information notification method and the various setting items that are set on the image reading device side are different from the first embodiment.

Figure 12:
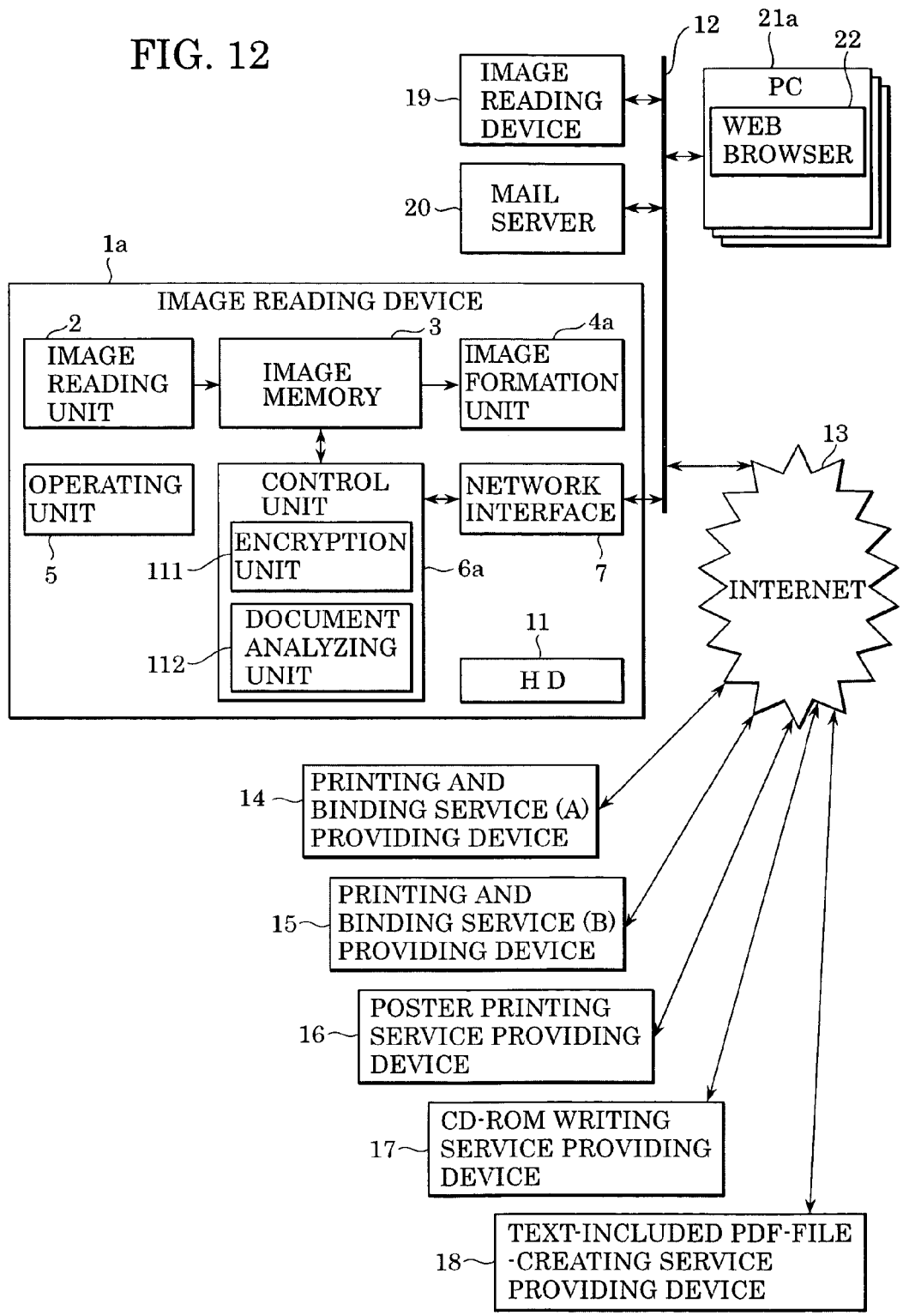
FIG. 12 is a block diagram illustrating a service ordering providing system according to the second embodiment of the present invention.

FIG. 12 is a block diagram illustrating the configuration of a service ordering providing system according to the second embodiment relating to the present invention. In FIG. 12, the components that are the same as or equivalent to those of the first embodiment (shown in FIG. 1) are denoted with the same reference numerals, and the description thereof will be omitted.

The first point in which the second embodiment differs from the first embodiment is that according to the first embodiment, the personal information of the user is supplied to the image reading device 1 from the IC card 9 via an IC card reader/writer 8, whereas according to the second embodiment, the image reading device 1a does not have an IC card reader/writer 8, and does not handle personal information of the user.

The second point in which the second embodiment differs from the first embodiment is that the image reading device 1a in the second embodiment does not have mail software installed. According to the first embodiment, the image reading device 1 notifies the user PC of the job identification information such as the URL or access password using e-mail, but according to the second embodiment, an image formation unit 4a is used to print the job identification information to paper and thus notify the user, as will be described with reference to FIG. 15.

The third point in which the second embodiment differs from the first embodiment is that an encryption unit 111 is newly provided on the control unit 6a of the image reading device 1a, and the document data read by the image reading unit 2 is encrypted at the encryption unit 111, and then sent to the service providing device on the Internet 13.

The fourth point in which the second embodiment differs from the first embodiment is that a document analyzing unit 112 is newly provided on the control unit 6a of the image reading device 1a, and the document analyzing unit 112 analyzes the document data read by the image reading unit 2, and the document analyzing unit 112 extracts the various document extraction information, such as the orientation of the document image, the letters/photographs/inclusion type of the document image, the text information within the document image, and the code information, from the document image.

FIG. 13 is a diagram illustrating the extraction information of each document extracted by the document analyzing unit 112 of the control unit 6a, from the document data read by the image reading unit 2.

First, the orientation of the image on the sheet document may be one of four types as illustrated in FIGS. 13A through 13D; facing upwards, facing downwards, facing sideways (left) and facing sideways (right). When printing on the service providing device side on the Internet, based on the document data obtained by reading in the sheet document, there are cases in which having this orientation information facilitates more appropriate processing. For example, in the case of performing stapling processing on the service providing device side on the Internet, normally stapling is performed on the upper left of an upward facing image, but if the information regarding the image orientation is available, that can be automatically processed.

Next, the image type on a sheet document may be an image that is mainly a text image 121 as illustrated in FIG. 13E, or an image that is mainly a bitmap (photograph) image 122 as illustrated in FIG. 13F, or an image that includes both text image 123 and bitmap image 124 as illustrated in FIG. 13G. When printing on the service providing device side on the Internet, based on the document data obtained by reading in the sheet document, there are cases when having this image type information facilitates more appropriate processing. For example, an image that is primarily a bitmap image should be printed on a printer with very high gradation, an image that is primarily a text image should be printed on a printer with high resolution, and an image that is mixed should be printed on a printer with above-average gradation and resolution. If the image type is known, an appropriate printer can be automatically selected. Further, even in the case of printing on one printer, favorable output results can be obtained by automatically changing the type of image processing of the printer based on the image type.

Next, the cover sheet of the sheet document often lists the title of the document as a text image 125 as illustrated in FIG. 13H. The document analyzing unit 112 performs OCR processing of the image data of the cover sheet, and from the title information as a letter image, the electronic title information is generated as electronic text information. There are cases in which having this electronic title information facilitates more appropriate processing when reading in this sheet document and printing on the service providing device side on the Internet. Specifically, using this electronic title information for a job name or file name on the service providing device on the Internet makes determination easier, and further, searching becomes easier. Further, simply, in the case in which inputting the original document title is necessary on the service providing device on the Internet, this electronic title information can be used, and thus reduce the additional work of inputting the information.

Next, in addition to the document title 125 being listed as a text image, as shown in FIG. 13I, the cover sheet of the sheet document may list the code information such as document identification information (ID) using a format such as a bar code 126. The document analyzing unit 112 recognizes and processes the cover sheet bar code 126, and generates a document ID. For example, in the case of FIG. 13I, the document ID of 32845 is extracted. The case exists in which having this document ID makes the appropriate processing possible when reading in this sheet document and printing on the service providing device side on the Internet. Specifically, in the event that manuscript data corresponding to the document ID on the service providing device on the Internet exists, there are cases in which printing with a better image quality can be obtained when using that original document data rather than the image data read from the image reading device 1.

The present embodiment introduces a one-dimensional bar code such as that in FIG. 13I as a method to enter the code information in a sheet document, but any method for entering code information may be used. For example, a two-dimensional bar code, or a method using magnetic ink, or a method that changes the frequency characteristics of the paper image based on the code information, or a method attaching code information to the foundation using a yellow toner, can be employed.

According to the second embodiment, like the first embodiment, the desired service is selected from the service list screen in FIG. 3. Then, according to the first embodiment, the user ID and user password is input in the user authentication screen to use the service 52, but according to the second embodiment, the user ID (device ID) for the individual device assigned to each device (image reading device) and the password thereof is used, and therefore the user authentication screen in FIG. 4 is not used. This is because the image reading device 1a of the second embodiment does not handle individual information of the user.

Figure 14:
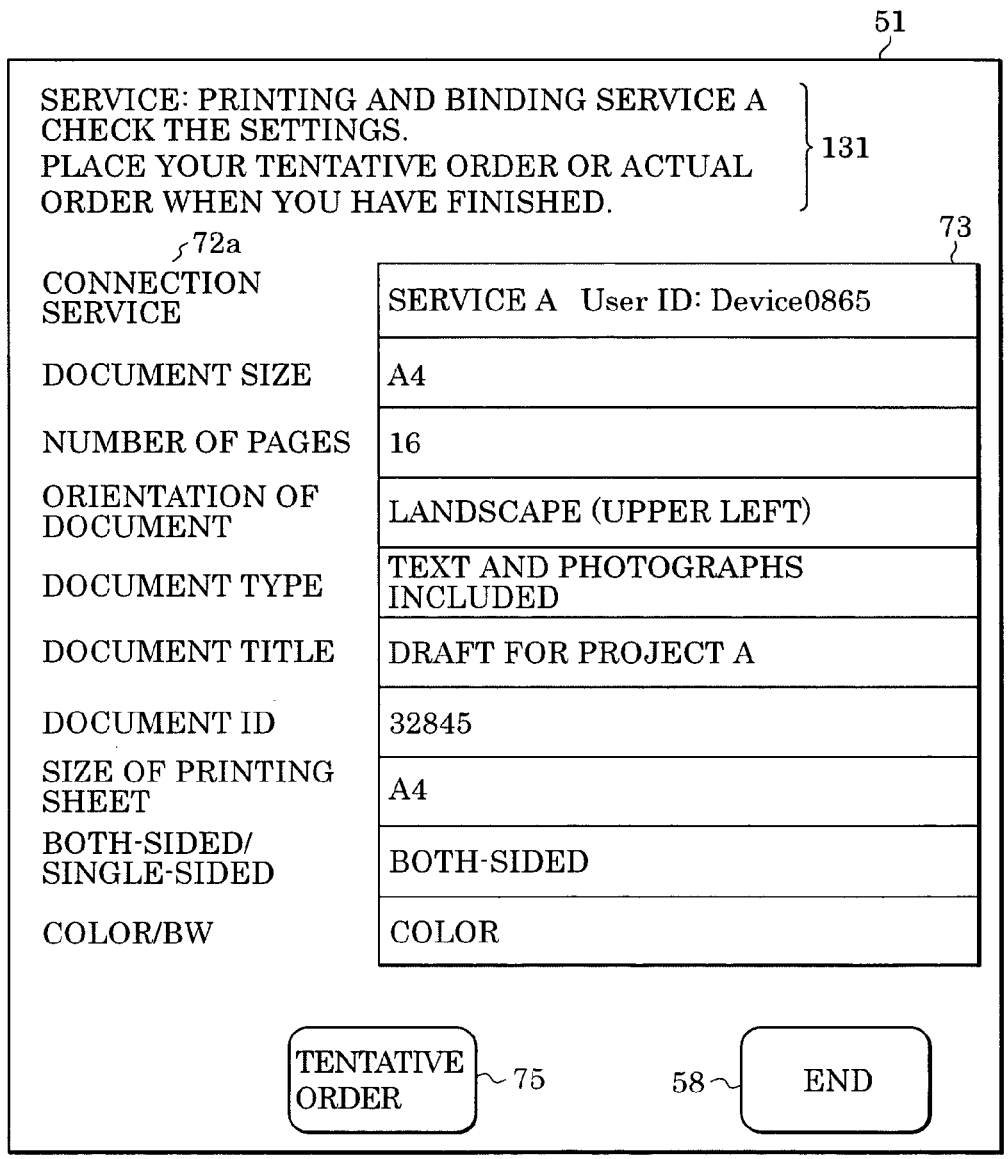
FIG. 14 is a diagram illustrating one example of the operating screen (ordering screen) of the service settings displayed on the operating unit of an image reading device according to the second embodiment.

FIG. 14 is a diagram illustrating one example of the operating screen (ordering screen) of the service settings displayed on the operating unit 5 of the image reading device 1a according to the second embodiment.

This service setting operation screen 51 is generally the same as the service setting screen (order screen according to the first embodiment illustrated in FIG. 6, but as a setting item 72a, the document orientation, the document type, the document title, and the document ID are added. The orientation of the document image analyzed in the document analyzing unit 112 is set as the document orientation. The document orientation for a document with multiple pages in which the orientation of each page may be different is set either as the orientation of the cover sheet or the most frequent orientation. The document type is set as the text/photograph/mixed type of document image detected by the document analyzing unit 112. Now, regarding a multiple page document in which the document type of each page may be different, the document type is set as the most frequent document type. The document title is set as the document information obtained through OCR processing of the title image within the cover sheet by the document analyzing unit 112. The document ID is set as the code information read from the bar code and so forth indicating the document ID within the cover sheet by the document analyzing unit 112.

On the other hand, items in which personal information is necessary according to the first embodiment, such as the delivery information, the billing party, the order placer and so forth have been omitted from the setting items 72a of the second embodiment. This is because the image reading device 1 according to the present embodiment does not handle personal information. Further, because the second embodiment does not set the setting items necessary for ordering, such as the delivery information, the billing party, the order placer and so forth, an order cannot be placed, as is evident from the message illustrated in location 131, and only a tentative order can be placed. Further, after the tentative order is placed, the setting values of the various setting items can be changed with a user PC, and therefore the second embodiment is configured so as not to allow changes to the various setting values. This provides the advantage of further shortening the time a user is exclusively using the image reading device 1a.

FIG. 15 is a diagram illustrating a service tentative order report 141. Upon the tentative order key 75 on the service setting operation screen illustrated in FIG. 14 being clicked, a tentative order is placed to the service providing device on the Internet, and the service tentative order report 141 illustrated in FIG. 15 is printed at the image formation unit 4a of the image reading device 1a.

The service tentative order report 141 lists the name of the service providing device, the user ID (device ID) at the time the tentative order was placed to this service providing device, and the URL for accessing the ordered job at a location 142. A tentative order is placed using a device ID (an ID identifying the image reading device) as a user ID, and therefore the job of a tentative order is saved in the folder for the device (image reading device) provided on the service providing device (in the example illustrated in FIG. 15, saved in the folder specified by the URL https://pod-service.net/Device0865). This device folder is a folder capable of multiple user access, but because the document data in a tentative order is encrypted, other users cannot see inside the document data.

The job ID of the tentative order is listed at a location 143, and the access password for that job (a decoded password) is listed at a location 144. This service tentative order report 141 is printed only once after the tentative order is placed. Based on the information listed in this service tentative order report 141, the user uses his or her own PC to access the tentative order job, sets the setting items such as the delivery information, the billing party, the order placer, and afterwards places the actual order.

FIG. 16 is a flowchart illustrating the procedure for the document-reading/tentative-ordering processing executed in the control unit 6a of the image reading device 1a according to the second embodiment. Compared to the document reading and order processing according to the first embodiment illustrated in FIG. 8, the processes of step S301 and step S304 and thereafter differs, and the processes of step S302 and step S303 are the same as to step S102 and step S103 in the first embodiment, respectively.

In Step S301, it is determined whether the service entry key (not shown) of the operating unit 5 of the image reading device 1a has been pressed. If the service entry key was pressed, the flow continues to step S303 (described below), otherwise, the flow continues to step S302 where other processing is performed and then the process returns to step S301.

Upon the user selecting one of the services of the service list displayed in step S303, the flow proceeds to step S304, the document is read using the scan screen illustrated in FIG. 5, and the read document data is encrypted with the encryption unit 111. Then, as with the first embodiment, the document information such as the original document size, the number of document pages, the single-sided/both-sided document differentiation, the color/BW document differentiation, and the like, is acquired, and further, in the document analyzing unit 121 the various document extraction information such as the orientation of the document image, the text/photograph/mixed type of the document image, the document information within the document image, and the code information from the document image is extracted from the read document data, and this is acquired as the document information.

In the next step S305, the setting values of the various setting items illustrated in FIG. 14 are decided, based on the acquired document information, and this is displayed as shown in FIG. 14.

In Step S306, the flow waits for a tentative order instruction or an end instruction from the user. In the case of an end instruction, the flow returns to step S301 without any activity. On the other hand, in the case of a tentative order instruction, the flow continues to step S307, and sends as one job the document data that was read and encrypted in step S304 and the various setting values decided in step S305 to the service providing device specified on the Internet, and a tentative order is placed. Along with this tentative order, the URL for accessing the sent job is acquired from the service providing device.

Next, in step S308, the service tentative order report illustrated as an example in FIG. 15 is printed, listing the decoded password necessary for decoding the encrypted data and the URL received from the service providing device, and this is notified to the user and the flow then returns to step S101.

The first embodiment is configured so that the image reading device 1 receives the access password for accessing the sent job from the service providing device, but according to the second embodiment, the image reading device 1a sends the encrypted document data to the service providing device, and the image reading device 1a handles the decoded password as the access password. The second embodiment is configured so that the decoded password is not sent from the document reading device 1a to the service providing device. By configuring in this manner, even the administrator of the service providing device cannot decode the encrypted document data, and therefore cannot see inside or print the content of the document. The decoded password is listed solely in the service tentative order report 141, and the user is notified thereof. Now, the administrator of the service providing device can delete the encrypted document data for anti-spamming purposes.

After the tentative order is placed by means of the document-reading/tentative-order-processing illustrated in FIG. 16, the actual order processing is performed on the individual user PCs. The user receives the service tentative order report 141 that is printed by the document reading device 1a, then starts the Web browser 22 of the user PC, accesses the URL as instructed, then using the Web authentication screen like that in FIG. 9, inputs the user ID for accessing the service providing device, inputs the password for accessing the service providing device, inputs the job ID, and inputs the access password (decoding password) for decoding the encrypted document data within that job. While a device ID is used as a user ID for placing a tentative order from the image reading device 1a in the arrangement described above, the user ID of the individual user is used in the case of accessing from the user PC.

The above user ID, password, job ID, and access password are sent to the specified service providing device, and if the result is that these are authenticated, the Web screen illustrated in FIG. 17 is displayed on the display device of the user PC, and the processing is enabled for the specified job.

FIG. 17 is a diagram illustrating the Web screen on the user PC in which setting values of each setting item relating to job ID 53280 are displayed. The various setting values illustrated in FIG. 17 correspond to the various setting values illustrated in FIG. 14, but compared to FIG. 14, there are more setting items relating to printing, such as binding instructions or number of copies, and the setting items relating to the individual information, such as delivery address, billing party, and the order placer. After making the settings on the extra setting items, the actual order can be placed by clicking an order key 104.

At the point in time of the tentative order, the job is tentatively ordered from the device ID, and the job is saved in the device folder, but when the actual order is placed, the job is managed by the user ID of the individual user that placed the order, and further, the job is moved to the folder corresponding to that user, and becomes inaccessible to other users.

Further, within the user PC, changes can be made to items other than the increased setting items, other than items that are automatically decided from the document information. For example, the title is set from the OCR result of the cover sheet, but that can be renamed.

The "transfer to other job" key 152 is a key for transferring the job tentatively ordered with the device ID to an actual order with a user ID, and does not place the order. Specifically, the applicable job is transferred from a device ID to a user ID, and the job is moved to the folder of that user, and becomes inaccessible to other users.

According to the second embodiment as described above, the image reading device does not handle individual information, and in the case of placing a tentative order from the image reading device, a device ID is used, and therefore has the advantage of a person other than the actual order placer being able to place a tentative order from the image reading device. For example, in the case that Mr. A desires to place an order, he can give the sheet document to Mr. B who is the secretary, and have the tentative order placed from the image reading device, and afterwards Mr. A can access his own job from his own computer and place the actual order.

According to the second embodiment, a device ID for identifying the image reading device is used in the case of placing a tentative order from the image reading device, but a user ID for a group that is shared by multiple users may also be used. The former has the advantage of being able to determine from which image reading device the tentative order was placed, and the latter has the advantage of being able to use the same user ID for a group with multiple image reading devices.

Other Embodiments

According to each of the above embodiments, the service providing device exists on the Internet, but the present invention can be applied to a service providing device that exists on an intranet. However, countless types of service devices exist on the Internet, and the service settings thereof are varied, and therefore applying a service providing device on the Internet is more beneficial to the present invention.

A storage medium storing software program code to realize the functions according to the above-described embodiments may be provided to a system or a device, with the computer (or CPU (central processing unit), MPU (micrprocessing unit), and so forth) of that system or device reading out and executing the program code stored in the storage medium.

In this case, the program code that is read out from the storage medium realizes the functions according to the present invention.

Examples of storage media that may be used to provide the program code include a flexible disks, hard disks, optical disks, magneto-optical disks, CD-ROM (compact disk-read-only memory), CD-R (compact disk-recordable), CD-RW (compact disk-rewritable), DVD-ROM (digital versatile disk-read-only memory), DVD-RAM, a DVD-RW, DVD+RW, magnetic tape, non-volatile memory cards, and ROM.

Further, the present invention is not restricted to cases in which the functions of the above-described embodiments are realized by executing the program code read out by the computer, but also encompasses arrangements in which the operating system and so forth running on the computer perform part or all of the processing, based on the instructions of the program code.

Further, the present invention also encompasses arrangements in which, following the program code being read out from the storage medium and written into the memory provided on a function expansion board inserted into a computer or a function expansion unit connected to a computer, a CPU or the like provided to the function expansion board or the function expansion unit performs part or all of the processing, based on the instructions of the program code.

While the present invention has been described with reference exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-404560 filed Dec. 3, 2003, which is hereby incorporated by reference herein.

What is claimed is:

1. A system, comprising:
an image reading device configured to communicate with a service providing device, the image reading device comprising:
a reading unit configured to read an original document, a display unit configured to display an ordering screen for setting values and for placing an order in connection with an original document read by the reading unit, wherein the order is a tentative order or an actual order that can be instructed on the ordering screen, wherein the tentative order is an order that is held and not filled by the service providing device and the actual order is an order that is filled by the service providing device, and
a sending unit configured to, in response to the actual order being instructed on the ordering screen displayed by the display unit, send directly to the service providing device the document read by the reading unit and the setting values set on the ordering screen, and, in response to the tentative order being instructed on the ordering screen displayed by the display unit, send directly to the service providing device the document read by the reading unit and the setting values set on the ordering screen and send, to an information processing device, tentative order access information to allow the information processing device to access the ordering screen for setting the setting values and placing an order of the document sent to the service providing device by the image reading device; and
the information processing device, wherein the information processing device is configured to communicate with the service providing device and the image reading device, the information processing device comprising:
an access unit configured to, based on the tentative order access information, access the ordering screen for setting the setting values and for placing the order of the document sent to the service providing device by the image reading device,
a changing unit configured to change, via the accessed ordering screen, a setting value including the setting values set in the image reading device of the document sent to the service providing device, and
an order unit configured to send setting values including setting values changed by the changing unit to the service providing device and to place the actual order of the document sent to the service providing device by the image reading device.

2. The system according to claim 1, wherein, in response to a tentative order on the ordering screen of the display unit including a setting value of a delivery address for an output of an actual order, the image reading device is configured to not allow a change in the delivery address setting value, and the changing unit of the information processing device subsequently changes the delivery address setting value after the tentative order is placed with the service providing device by the image reading device.

3. The system according to claim 2, wherein input devices to an operating unit of the image reading device include devices other than a keyboard and a mouse.

4. The system according to claim 1, wherein the service providing device includes a set of services and the set of services are registered on the image reading device in advance of the reading unit reading an original document.

5. The system according to claim 4, wherein the display unit further is configured to display a service list screen, wherein a service from the set of services can be instructed on the service list screen, and, in response to a service being instructed on the service list screen, the sending unit sends device access information to the service providing device and receives an authentication response from the service providing device, wherein the image reading device further is configured to determine whether to display an operation instruction screen based on the received authentication response.

6. The system according to claim 1, wherein the ordering screen of the image reading device includes a key associated with a set of candidate setting values, and in response to the key being selected, the image reading device receives additional candidate setting values from the service providing device that are added to the set of candidate setting values.

7. The system according to claim 1, wherein, in response to the image reading device receiving tentative order access information from the service providing device, the image reading device sends the tentative order access information to the information processing device.

8. The system according to claim 7, wherein, in response to the image reading device sending a tentative order password to the service providing device, the service providing device returns the tentative order password and a resource locator to the image reading device as the tentative order access information.

9. The system according to claim 1, wherein the information processing device is configured to load a Web browser and the image reading device is configured not to load a Web browser.

10. The system according to claim 1, wherein, prior to the access unit accessing a tentative order on the service providing device, the information processing device is configured to send tentative order access information received from the image reading device and device access information to the service providing device.

11. The system according to claim 1, wherein processing access to the changing unit of the information processing device during a time when a setting value of a tentative order is changed is limited to a single user and, during this same time, processing access to the image reading device is open to multiple users.

12. The system according to claim 1, wherein, the information processing device includes a display unit that displays an ordering screen having a number of setting items, and wherein the display unit of the image reading device is of a size that prevents the display unit of the image reading device from displaying all of the setting items displayed in the ordering screen of the information processing device.

13. The system according to claim 1,
wherein the changing unit displays the accessed setting values of the document set in the image reading device to change the setting value of the document.

14. The system according to claim 1,
wherein the changing unit displays the accessed setting values of the document set in the image reading device and additional setting values to change the setting values and/or the additional setting values of the document.

15. A method, comprising:
reading, using an image reading device configured to communicate with a service providing device, an original document;
displaying, using the image reading device, an ordering screen for setting values and for placing an order in connection with a read original document read, wherein the order is a tentative order or an actual order that can be instructed on the ordering screen, wherein the tentative order is an order that is held and not filled by the service providing device and the actual order is an order that is filled by the service providing device, wherein, in response to the actual order being instructed on the displayed ordering screen, sending, using the image reading device, directly to the service providing device the read document and the setting values set on the ordering screen, and wherein, in response to the tentative order being instructed on the displayed ordering screen:

sending, using the image reading device, directly to the service providing device the read document and the setting values set on the ordering screen, sending, to an information processing device, tentative order access information to allow the information processing device to access the ordering screen for setting the setting values and for placing the order of the document sent to the service providing device by the image reading device, wherein the information processing device is configured to communicate with the service providing device and the image reading device, accessing, using the information processing device and based on the tentative order access information, the ordering screen for setting the setting values and placing the order of the document sent to the service providing device by the image reading device, changing, using the information processing device and via the accessed ordering screen, a setting value including the setting values set in the image reading device of the document sent to the service providing device, sending, using the information processing device, setting values including setting values changed by the information processing device to the service providing device, and placing, using the information processing device, the actual order of the document sent to the service providing device by the image reading device.

16. The method according to claim 15,
wherein changing includes displaying the accessed setting values of the document set in the image reading device to change the setting value of the document.

17. The method according to claim 15,
wherein changing includes displaying the accessed setting values of the document set in the image reading device and additional setting values to change the setting values and/or the additional setting values of the document.

18. A non-transitory storage medium storing a program that causes a system containing an image reading device and an information processing device to perform a method according to claim 15.

19. The non-transitory storage medium according to claim 18,
wherein changing includes displaying the accessed setting values of the document set in the image reading device to change the setting value of the document.

20. The non-transitory storage medium according to claim 18,
wherein changing includes displaying the accessed setting values of the document set in the image reading device and additional setting values to change the setting values and/or the additional setting values of the document.

* * * * *